United States Patent
Choi

(10) Patent No.: US 10,619,600 B2
(45) Date of Patent: Apr. 14, 2020

(54) RECIRCULATION VALVE

(71) Applicants: HYUNDAI MOTOR COMPANY, Seoul (KR); KIA MOTORS CORPORATION, Seoul (KR)

(72) Inventor: Choo Saeng Choi, Seongnam-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 16/163,966

(22) Filed: Oct. 18, 2018

(65) Prior Publication Data
US 2019/0186429 A1 Jun. 20, 2019

(30) Foreign Application Priority Data
Dec. 18, 2017 (KR) .................... 10-2017-0174093

(51) Int. Cl.
F02B 47/08 (2006.01)
F02M 26/16 (2016.01)
F02M 26/73 (2016.01)
F02M 26/21 (2016.01)
F02M 26/00 (2016.01)

(52) U.S. Cl.
CPC ............ *F02M 26/16* (2016.02); *F02M 26/21* (2016.02); *F02M 26/73* (2016.02); *F02M 2026/004* (2016.02)

(58) Field of Classification Search
CPC ........ F02M 26/16; F02M 26/21; F02M 26/73; F02M 2026/004

USPC .......................... 123/568.12, 568.17, 568.18
See application file for complete search history.

(56) References Cited

U.S. PATENT DOCUMENTS

| | | | | |
|---|---|---|---|---|
| 4,122,810 A | * | 10/1978 | Berriman | F02M 9/133 123/568.31 |
| 5,511,531 A | * | 4/1996 | Cook | F02M 26/68 123/568.21 |
| 5,570,721 A | | 11/1996 | Funke et al. | |
| 7,011,081 B2 | * | 3/2006 | Hrytzak | F02M 26/69 123/568.17 |
| 7,428,897 B2 | * | 9/2008 | Koster | F02M 26/48 123/568.11 |
| 7,762,242 B2 | * | 7/2010 | Gates | F02M 26/57 123/568.18 |
| 2008/0098999 A1 | * | 5/2008 | Melhem | F02M 35/10144 123/568.18 |

FOREIGN PATENT DOCUMENTS

KR  20-0134438 B  10/1998

\* cited by examiner

*Primary Examiner* — Hai H Huynh
(74) *Attorney, Agent, or Firm* — Morgan, Lewis & Bockius LLP

(57) ABSTRACT

A recirculation valve of an exhaust gas recirculation apparatus includes: a valve housing having a gas inlet into which a recirculation gas flows, a gas outlet from which the recirculation gas is discharged, and an intermediate inlet disposed between the gas inlet and the gas outlet; and a valve body selectively opening and closing the gas inlet and the intermediate inlet.

8 Claims, 4 Drawing Sheets

Normal blocking position    Maximum open position    Abnormal blocking position    Abnormal gas blocking

RECIRCULATION VALVE

CROSS-REFERENCE TO RELATED APPLICATION

This application claims priority to and the benefit of Korean Patent Application No. 10-2017-0174093 filed in the Korean Intellectual Property Office on Dec. 18, 2017, the entire contents of which are incorporated herein by reference.

TECHNICAL FIELD

The present disclosure relates to a recirculation valve. More particularly, the present disclosure relates to a recirculation valve included in an exhaust gas recirculation apparatus.

BACKGROUND

Generally, a nitrogen oxide (NOx) included in exhaust gas is a cause of acid rain, harms eyes and respiratory organs, and withers plants. The NOx is regulated as a major air pollutant, and much research has been carried out in order to reduce an amount of the NOx in exhaust gases.

An exhaust gas recirculation (EGR) system is provided in a vehicle for reducing noxious exhaust gas. Generally, the NOx is increased in a case where an air-fuel ratio of an air-fuel mixture is high, which may be necessary for sufficient combustion. Thus, the exhaust gas recirculation system mixes some (e.g., 5-20%) of exhaust gas from an engine with the air-fuel mixture, thereby reducing an amount of oxygen in the air-fuel mixture and retarding combustion, thus suppressing generation of the NOx.

A typical exhaust gas recirculation system recirculates some exhaust gas that is exhausted from a cylinder of an engine through an exhaust manifold to flow back to the cylinder of the engine, through a recirculation line. A recirculation valve is mounted in the recirculation line to control an EGR rate.

However, in a conventional recirculation valve, when a foreign material is accumulated inside the recirculation valve due to an abnormal cause, some recirculation gas may leak into a combustion chamber of the engine through the recirculation valve, even though the recirculation valve is closed.

As such, combustion stability of the engine may be degraded when the recirculation gas leaks into the combustion chamber in the case that the recirculation valve is to be closed.

The above information disclosed in this Background section is only for enhancement of understanding of the background of the invention and therefore it may contain information that does not form the prior art that is already known in this country to a person of ordinary skill in the art.

SUMMARY

The present disclosure has been made in an effort to provide a recirculation valve that may prevent inflow and/or outflow of recirculation gas when a foreign material is lodged inside the recirculation valve due to an abnormal cause.

An exemplary embodiment of the present disclosure provides a recirculation valve of an exhaust gas recirculation apparatus, including: a valve housing having a gas inlet into which a recirculation gas flows, a gas outlet from which the recirculation gas is discharged, and an intermediate inlet disposed between the gas inlet and the gas outlet; and a valve body selectively opening and closing the gas inlet and the intermediate inlet.

The valve body may selectively open and close the gas inlet or the intermediate inlet while changing between the gas inlet and the intermediate inlet.

The valve body may include an upper portion configured to selectively open and close the intermediate inlet, and a lower portion configured to selectively open and close the gas inlet.

The upper portion of the valve body may be formed to have a conical, hemispherical, or polyhedral shape, the intermediate inlet may be formed to have a shape corresponding to the upper portion of the valve body, the lower portion of the valve body may be formed to have a conical, hemispherical, or polyhedral shape, and the gas inlet may be formed to have a shape corresponding to the lower portion of the valve body.

An upper tilt angle formed by the upper portion of the valve body may be greater than a lower tilt angle formed by the lower portion of the valve body.

At a maximum open position where the valve body is maximally opened, a shortest distance between the upper portion of the valve body and the intermediate inlet may be equal to or longer than a shortest distance between the lower portion of the valve body and the gas inlet.

At a maximum open position where the valve body is maximally opened, a distance between an intermediate portion where the upper portion of the valve body and the lower portion of the valve body directly contact each other and the intermediate inlet may be longer than a distance between the intermediate portion and the gas inlet.

The maximum open position may be a position where a flow rate of the gas discharged to the gas outlet through the intermediate inlet from the gas inlet is maximized when the valve body changes between the gas inlet and the intermediate inlet.

In a normal operation, a flow rate of the recirculation gas may be adjusted while the valve body changes between the maximum open position and a normal blocking position where the upper portion of the valve body contacts the intermediate inlet.

In the normal operation, the upper portion of the valve body may block the intermediate inlet to block inflow of the recirculation gas.

In an abnormal operation, the lower portion of the valve body may block the gas inlet to block inflow of the recirculation gas.

A distance between the gas inlet and the intermediate inlet may be longer than a distance from a position where the upper portion of the valve body contacts the intermediate inlet to a position where the lower portion of the valve body contacts the gas inlet.

According to the recirculation valve of the exemplary embodiment of the present disclosure, when the recirculation valve normally operates, an upper portion of a valve body thereof may block an intermediate inlet, and when the recirculation valve abnormally operates, a lower portion of the valve body thereof may block a gas inlet to prevent inflow of the recirculation gas.

As such, it is possible to completely block the recirculation gas flowing into the combustion chamber of the engine through the recirculation valve by dualizing the structure in which the recirculation valve is shut off, even when a foreign material is lodged in the recirculation valve such that the recirculation valve abnormally operates.

BRIEF DESCRIPTION OF THE DRAWINGS

The drawings are provided for reference in describing exemplary embodiments of the present disclosure, and the spirit of the present disclosure should not be construed only by the accompanying drawings.

DETAILED DESCRIPTION OF THE EMBODIMENTS

Figure 1:
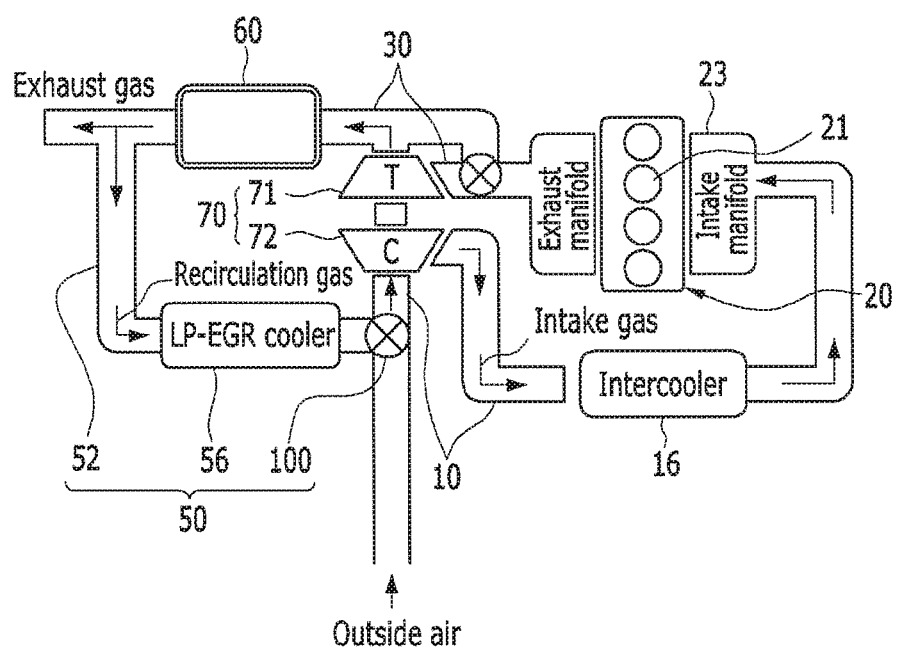
FIG. 1 illustrates a schematic view of an engine system in which a recirculation valve according to an exemplary embodiment of the present disclosure is applied.

The present disclosure will be described more fully hereinafter with reference to the accompanying drawings, in which exemplary embodiments of the invention are shown. As those skilled in the art would realize, the described embodiments may be modified in various different ways, all without departing from the spirit or scope of the present disclosure.

Parts that are irrelevant to the description will be omitted to clearly describe the present disclosure, and like reference numerals designate like elements throughout the specification.

Further, the size and thickness of each component shown in the drawings are arbitrarily shown for better understanding and ease of description, but the present disclosure is not limited thereto. In the drawings, the thickness of layers, films, panels, regions, etc., are exaggerated for clarity.

Hereinafter, a recirculation valve according to an exemplary embodiment of the present disclosure will be described with reference to the accompanying drawings.

Figure 2:
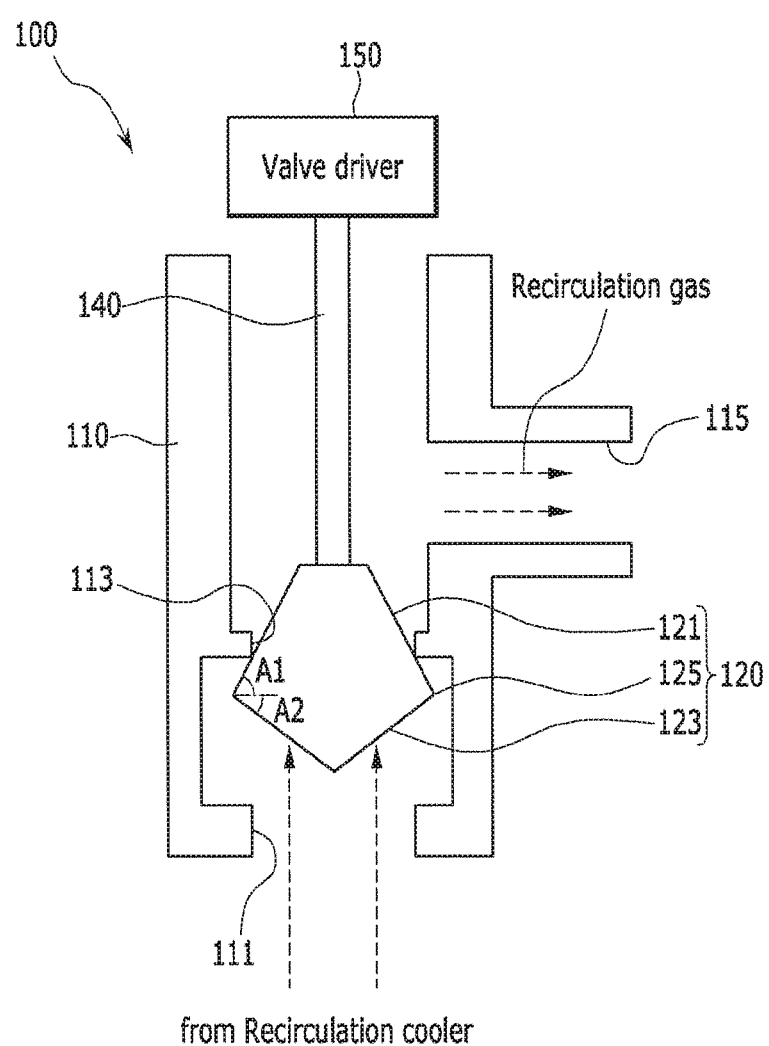
FIG. 2 illustrates a schematic view of a recirculation valve according to an exemplary embodiment of the present disclosure.

FIG. 1 illustrates a schematic view of an engine system in which a recirculation valve according to an exemplary embodiment of the present disclosure is applied. FIG. 2 illustrates a schematic view of a recirculation valve according to an exemplary embodiment of the present disclosure.

As shown in FIG. 1 and FIG. 2, an engine system in which a recirculation valve according to an exemplary embodiment of the present disclosure is applied may include an engine 20 and an exhaust gas recirculation apparatus 50 (e.g., a low pressure EGR apparatus).

The engine 20 includes a plurality of combustion chambers 21 that generate power by combustion of a fuel. The engine 20 is provided with an intake line 10 in which intake gas supplied to the combustion chamber 21 flows, and an exhaust line 30 in which exhaust gas exhausted from the combustion chamber 21 flows.

The exhaust line 30 is provided with an exhaust gas purification apparatus 60 for purifying various harmful materials contained in the exhaust gas exhausted from the combustion chamber 21. The exhaust gas purification apparatus 60 may include a lean NOx trap (LNT), a diesel oxidation catalyst, and a diesel particulate filter for purifying the nitrogen oxide.

The exhaust line 30 is provided with a turbocharger 70 for compressing the intake gas (outside air+recirculation gas) flowing through the intake line 10 and supplying the compressed intake gas to the combustion chamber 21. The turbocharger 70 includes a turbine 71 provided in the exhaust line 30 and rotated by the exhaust gas exhausted from the combustion chamber 21, and a compressor 72 that rotates in conjunction with the turbine 71 to compress the intake gas.

The intake line 10 is provided with an intercooler 16 for cooling the intake gas flowing through the intake line 10 through heat exchange with a coolant. Since the intake gas compressed by the turbocharger 70 is expanded as its temperature increases, oxygen density of the intake gas supplied to the combustion chamber 21 decreases, thus it is difficult to obtain output torque required in the engine 20. Accordingly, it is possible to improve combustion efficiency of the engine 20 by cooling the intake gas through the intercooler 16 so that the density of the intake gas is increased.

The low pressure EGR (LP-EGR) apparatus 50 includes a recirculation line 52, a recirculation cooler 56, and a recirculation valve 100. In the exemplary embodiment of the present disclosure, the low pressure EGR apparatus is exemplarily described, but another type of exhaust gas recirculation apparatus (e.g., a high pressure EGR apparatus) may be applicable.

Hereinafter, a structure of the recirculation valve will be described with reference to the accompanying drawings.

Figure 3:
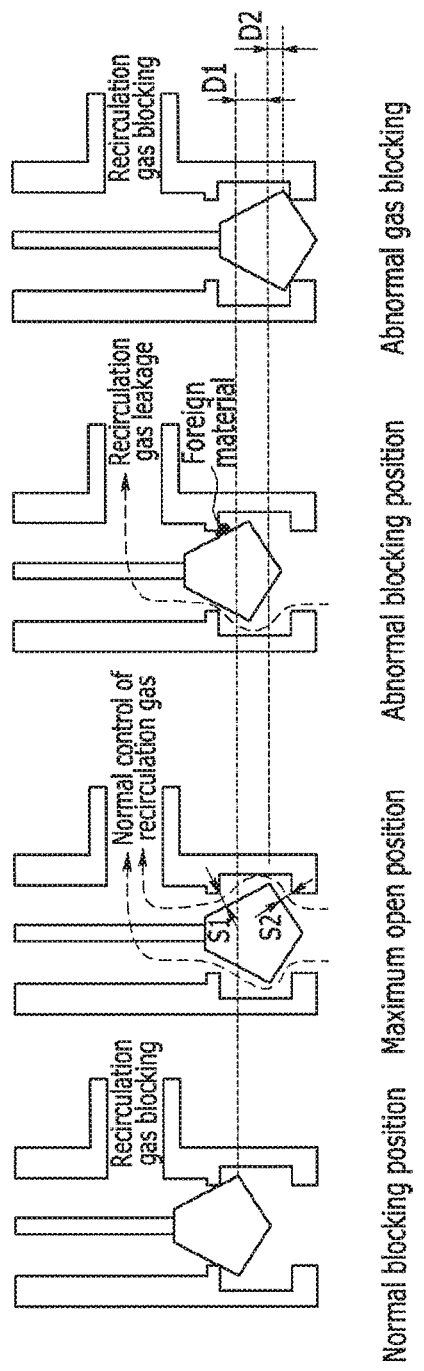
FIG. 3 illustrates an operational view for explaining an operation of a recirculation valve according to an exemplary embodiment of the present disclosure.

FIG. 3 illustrates an operational view for explaining an operation of a recirculation valve according to an exemplary embodiment of the present disclosure.

Referring to FIG. 3, as well as FIG. 1 and FIG. 2, the recirculation valve 100 may include a gas inlet 111, a valve housing 110 provided with a gas outlet 115 and an intermediate inlet 113, a valve body 120 for selectively opening or closing the gas inlet 111 and the intermediate inlet 113, and a valve driver 150 for generating power for driving the valve body 120.

The gas inlet 111 is opened and formed at one end of the valve housing 110, the gas outlet 115 is opened and formed at another end of the valve housing 110, and the intermediate inlet 113 is formed between the gas inlet 111 and the gas outlet 115.

Some of the exhaust gas (hereinafter referred to as 'recirculation gas') is discharged to the gas outlet 115 through the gas inlet 111 and the intermediate inlet 113. The recirculation gas discharged to the gas outlet 115 is cooled through the intercooler 16 and then flows into the combustion chamber 21 of the engine 20. That is, a flow path of the recirculation gas flowing inside the valve housing 110 is formed by the gas inlet 111, the intermediate inlet 113, and the gas outlet 115.

The valve body 120 selectively opens or closes the gas inlet 111 or the intermediate inlet 113 while changing between the gas inlet 111 and the intermediate inlet 113 by the power of the valve driver 150.

For this, the valve body 120 may include an upper portion 121 for selectively opening or closing the intermediate inlet 113, and a lower portion 123 for selectively opening or closing the gas inlet 111. The valve body 120 is formed by combining the upper portion 121 and the lower portion 123 to each other, and the upper portion 121 and the lower portion 123 may be integrally formed to form the valve body 120.

In this case, it is desirable for a distance between the gas inlet 111 and the intermediate inlet 113 to be longer than a distance from a position where the upper portion 121 of the valve body 120 contacts the intermediate inlet 113 to a position where the lower portion 123 of the valve body 120 contacts the gas inlet 1.

The upper portion 121 of the valve body 120 may be formed to have a conical, hemispherical, or polyhedral shape, and the intermediate inlet 113 may be formed to have a conical (or circular), hemispherical (or circular), or a polyhedral (or polygonal) shape to correspond to the upper portion 121 of the valve body 120. The lower portion 123 of the valve body 120 may have a conical, hemispherical, or polyhedral shape, and the gas inlet 111 may have a conical (or circular), hemispherical (or circular), or a polyhedral (or polygonal) shape to correspond to the lower portion 123 of the valve body 120.

In this case, it is desirable that an upper tilt angle A1 formed by the upper portion 121 of the valve body 120 is greater than a lower tilt angle A2 formed by the lower portion 123 of the valve body 120. At a maximum open position where the valve body 120 is maximally opened, a shortest distance S1 between the upper portion 121 of the valve body 120 and the intermediate inlet 113 may be equal to or longer than a shortest distance S2 between the lower portion 123 of the valve body 120 and the gas inlet 111. In addition, at a maximum open position where the valve body 120 is maximally opened, a distance (a normal blocking position) between an intermediate portion 125 where the upper portion 121 of the valve body 120 and the lower portion 123 of the valve body 120 directly contact each other and the intermediate inlet 113 may be longer than a distance (an abnormal blocking position) between the intermediate portion 125 and the gas inlet 111.

Here, the maximum open position means a position where a flow rate of the gas discharged to the gas outlet through the intermediate inlet 113 from the gas inlet 111 is maximized when the valve body 120 changes between the gas inlet 111 and the intermediate inlet 113.

The valve driver 150 transmits power to the valve body 120 through a driving shaft 140. That is, the valve body 120 is moved up and down according to an operation of the valve driver 150. The valve driver 150 may be configured to include a cam, a gear, and a motor.

Hereinafter, an operation of the recirculation valve according to the exemplary embodiment of the present disclosure described above will be described with reference to the accompanying drawings.

Figure 4:
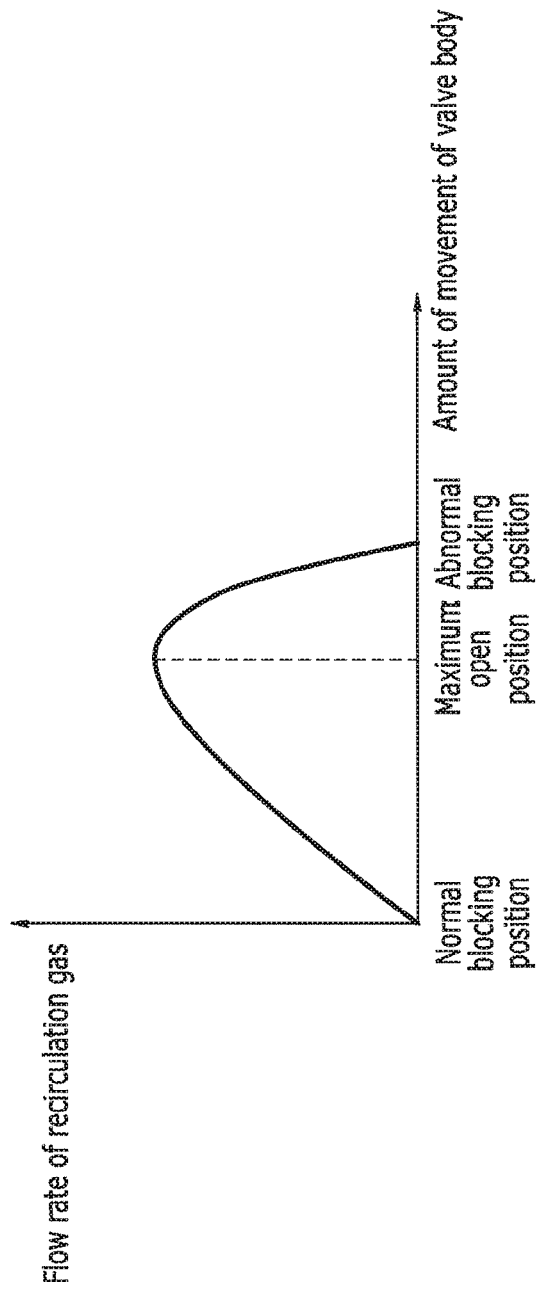
FIG. 4 illustrates a relationship graph between an amount of movement of a valve body of a recirculation valve according to an exemplary embodiment of the present disclosure and a flow rate of recirculation gas.

FIG. 3 illustrates an operational view for explaining an operation of a recirculation valve according to an exemplary embodiment of the present disclosure. FIG. 4 illustrates a relationship graph between an amount of movement of the valve body 120 of the recirculation valve according to the exemplary embodiment of the present disclosure and a flow rate of the recirculation gas.

Referring to FIG. 3 and FIG. 4, when the recirculation valve 100 operates in a normal state, the flow rate of the recirculation gas inputted/outputted through the recirculation valve 100 is adjusted as the valve body 120 moves from the maximum open position to the normal blocking position (see "D1" of FIG. 3). That is, when the valve body 120 is positioned at the maximum open position, the flow rate of the recirculation gas inputted/outputted through the recirculation valve 100 is maximized, and the upper portion 121 of the valve body 120 is positioned at the normal blocking position contacting the intermediate inlet 113, so that the recirculation gas inputted/outputted through the recirculation valve 100 is blocked.

In this case, since the distance from the maximum open position to the normal blocking position is longer than the distance from the maximum open position to the abnormal blocking position, a change in the flow rate of the recirculation gas depending on the movement amount of the valve body 120 is small. In addition, since the upper tilt angle A1 is greater than the lower tilt angle A2 and the shortest distance between the upper portion 121 of the valve body 120 and the intermediate inlet 113 is equal to or longer than that between the lower portion 123 of the valve body 120 and the gas inlet 111, the flow rate of the recirculation gas inputted through the valve body 120 and the gas inlet 111 is larger than that of the recirculation gas outputted through the valve body 120 and the intermediate inlet 113. Further, the flow rate of the recirculation gas depending on the amount of movement of the valve body 120 from the maximum open position to the normal blocking position while the recirculation valve 100 normally operates is relatively lower than the flow rate of the recirculation gas depending on the amount of movement of the valve body 120 from the maximum open position to the abnormal blocking position while the recirculation valve 100 abnormally operates. Therefore, the flow rate of the recirculation gas inputted/outputted through the recirculation valve 100 may be easily controlled.

In order to block the recirculation gas through the recirculation valve 100, the upper portion 121 of the valve body 120 blocks the intermediate inlet 113, thus it blocks the recirculation gas inputted/outputted through the recirculation valve 100.

In an abnormal case such as lodging of a foreign material around the intermediate inlet 113 of the recirculation valve 100, even if the valve body 120 is positioned at the normal blocking position, since the recirculation valve 100 may not completely block the recirculation gas due to the foreign material lodged between the upper portion 121 of the valve body 120 and the intermediate inlet 113, the recirculation gas may leak into the combustion chamber of the engine.

When the recirculation valve 100 abnormally operates, the flow rate of the recirculation gas inputted/outputted through the recirculation valve 100 is adjusted while the valve body 120 changes from the maximum open position to the gas inlet 111. In order to block the recirculation gas through the recirculation valve 100, the lower portion 123 of the valve body 120 blocks the gas inlet 111 to block the recirculation gas inputted/outputted through the recirculation valve 100.

In this case, a movement distance D2 of the valve body 120 from the maximum open position to the abnormal blocking position when the recirculation valve 100 abnormally operates is shorter than a movement distance D1 of the valve body 120 from the maximum open position to the normal blocking position when the recirculation valve 100 normally operates. Therefore, if a foreign material is lodged in the intermediate inlet 113 such that a leakage amount of the recirculation gas excessively increases, the body of the recirculation valve 100 may quickly block the gas inlet 111 to prevent the recirculation gas from flowing into the combustion chamber of the engine.

As described above, by dualizing the structure for blocking the inflow/outflow of the recirculation gas through the recirculation valve 100, even when the recirculation valve 100 abnormally operates because the foreign material is lodged therein, it is possible to completely block the recirculation gas from flowing into the combustion chamber of the engine through the recirculation valve 100.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A recirculation valve of an exhaust gas recirculation apparatus, comprising:
    a valve housing having a gas inlet into which a recirculation gas flows, a gas outlet from which the recirculation gas is discharged, and an intermediate inlet disposed between the gas inlet and the gas outlet; and
    a valve body selectively opening and closing the gas inlet and the intermediate inlet,
    wherein the valve body selectively opens and closes the gas inlet or the intermediate inlet while moving between the gas inlet and the intermediate inlet,
    wherein the valve body includes:
        an upper portion selectively opening and closing the intermediate inlet; and
        a lower portion selectively opening and closing the gas inlet,
    wherein, when the valve body is maximally opened at a maximum open position, a shortest distance between the upper portion of the valve body and the intermediate inlet is equal to or longer than a shortest distance between the lower portion of the valve body and the gas inlet, and
    wherein, when the valve body is maximally opened at the maximum open position, a distance between an intermediate portion, at which the upper portion of the valve body and the lower portion of the valve body directly contact each other, and the intermediate inlet is longer than a distance between the intermediate portion and the gas inlet.

2. The recirculation valve of claim 1, wherein the upper portion of the valve body has a conical, hemispherical, or polyhedral shape, the intermediate inlet has a shape corresponding to the upper portion of the valve body, and
    wherein the lower portion of the valve body has a conical, hemispherical, or polyhedral shape, and the gas inlet has a shape corresponding to the lower portion of the valve body.

3. The recirculation valve of claim 2, wherein an upper tilt angle of the upper portion of the valve body is greater than a lower tilt angle of the lower portion of the valve body.

4. The recirculation valve of claim 1, wherein the maximum open position is a position at which a flow rate of the gas discharged to the gas outlet through the intermediate inlet from the gas inlet is maximized as the valve body moves between the gas inlet and the intermediate inlet.

5. The recirculation valve of claim 4, wherein, in a normal operation, a flow rate of the recirculation gas is adjusted while the valve body moves between the maximum open position and a normal blocking position at which the upper portion of the valve body contacts the intermediate inlet.

6. The recirculation valve of claim 5, wherein, in the normal operation, the upper portion of the valve body blocks the intermediate inlet to block inflow of the recirculation gas.

7. The recirculation valve of claim 5, wherein, in an abnormal operation, the lower portion of the valve body blocks the gas inlet to block inflow of the recirculation gas.

8. The recirculation valve of claim 1, wherein a distance between the gas inlet and the intermediate inlet is longer than a distance from a position at which the upper portion of the valve body contacts the intermediate inlet to a position at which the lower portion of the valve body contacts the gas inlet.

* * * * *